United States Patent
Zhang et al.

(10) Patent No.: US 9,230,148 B2
(45) Date of Patent: Jan. 5, 2016

(54) METHOD AND SYSTEM FOR BINARIZATION OF TWO DIMENSIONAL CODE IMAGE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 72 days.

(21) Appl. No.: 14/102,638

(22) Filed: Dec. 11, 2013

(65) Prior Publication Data
US 2015/0090791 A1    Apr. 2, 2015

(30) Foreign Application Priority Data
Sep. 29, 2013   (CN) .......................... 2013 1 0455030

(51) Int. Cl.
G06K 7/10   (2006.01)
G06K 7/14   (2006.01)

(52) U.S. Cl.
CPC ............ G06K 7/1478 (2013.01); G06K 7/1417 (2013.01)

(58) Field of Classification Search
CPC ...................................... G06K 7/1478
USPC .......................... 235/462.04, 462.1, 494, 454
See application file for complete search history.

(56) References Cited

U.S. PATENT DOCUMENTS

| | | | |
|---|---|---|---|
| 7,997,502 B2 * | 8/2011 | Lv et al. ......................... | 235/494 |
| 2006/0091215 A1 * | 5/2006 | Uchiyama ................... | 235/462.1 |
| 2013/0140354 A1 * | 6/2013 | Fan et al. ...................... | 235/375 |
| 2014/0104083 A1 * | 4/2014 | Liu ................................ | 341/59 |
| 2014/0334730 A1 * | 11/2014 | Shen et al. .................... | 382/184 |

* cited by examiner

Primary Examiner — Allyson Trail
(74) Attorney, Agent, or Firm — Brinks Gilson & Lione

(57) ABSTRACT

Binarization method and system for two dimensional code images is provided. Each block region has a different grayscale threshold. Thus, for each block region, whether a pixel in the block region is determined as black or white restoring process is not solely based on the grayscale value of the pixel itself, but also an average grayscale value of a predetermined area specified for a block region where the pixel locates. That is to say, when the predetermined area in which the block region locates has generally a larger grayscale value, the grayscale threshold corresponding to the block region may become larger, and vice versa. Because the grayscale threshold of a block region is closely related to grayscale values in a background of this block region, external circumstance interference may be prevented from an obtained binary result, producing a clear binary image accordingly.

19 Claims, 4 Drawing Sheets

METHOD AND SYSTEM FOR BINARIZATION OF TWO DIMENSIONAL CODE IMAGE

CROSS-REFERENCE TO RELATED APPLICATIONS

This application claims priority to Chinese Patent Application No. 201310455030.7, filed on Sep. 29, 2013 and entitled "METHOD AND SYSTEM FOR BINARIZATION OF TWO DIMENSIONAL CODE IMAGE", which is incorporated herein by reference in its entirety.

FIELD OF THE INVENTION

The present invention relates to the field of image conversion techniques, and more particular, to a method and system for binarizing a two dimensional code image in the situation of darkness, non-uniform illumination or an over high/low contrast.

DESCRIPTION OF THE RELATED ART

Recently, with the development of the automation of information collection, two dimensional codes have gained wider and wider applications. The process of two dimensional code reading and recognition comprises: capturing a two dimensional code image with an image sensor of a two dimensional code reader, after that binarizing the two dimensional code image on the base of its each pixel using a two dimensional code recognition algorithm, and then obtaining a binary code stream of the two dimensional code according to a corresponding two dimensional code specification to realize the reading and recognition of the two dimensional code.

Because an image comprises target objects, a background and perhaps noises, one of the most common methods for extracting a target object directly from a multi-level image is to set a threshold T, by which data of the image may be divided into two parts: a set of pixels having values larger than the threshold T, and a set of pixels having values less than the threshold T. This is a method commonly used to study grayscale conversion, i.e., image binarization. Image binarization is, in brief, a process of setting grayscale values of pixels to 0 or 255 in an image, i.e. having the whole image represented with a distinct black-and-white effect.

However, due to different mediums on which two dimensional codes may be attached, different illumination environments, and different imaging systems, two dimensional code images may be captured by two dimensional code readers in a wide variety of qualities. Noises, non-uniform illumination, too high/low contrasts may complicate the conversion of binary images, and the effect of image binarization may have a direct impact on two dimensional code reading and recognition.

Presently, there are mainly two kinds of binarization processing techniques for grayscale images.

One is the use of a global threshold, in which a fixed threshold value is computed as a global histogram threshold or an optimal global threshold in the Otsu method to binarize an image. This method has a less amount of computation and may achieve a favourable performance for grayscale images of high quality. However, this method is not suitable for the binarization of images with heavy interference.

The other is the use of a dynamic threshold, in which with variances in image areas, a threshold is dynamically computed for each point, such as through averaging or weighting thresholds in a small area for binarization, i.e., a set of threshold values related to pixel locations (i.e., as a function of threshold coordinates) are used to segment various portions of the image. These algorithms may obtain more accurate binarization results for any images, however with higher time complexity and a large amount of computation.

Thus, with the increasingly improved demands of users, a binarization method is highly desired, which may obtain accurate binarization results for two dimensional code images with heavy interference efficiently.

SUMMARY OF THE INVENTION

Thus, a method and system for binarizing a two dimensional code image is provided in this invention to solve the technical problem in the art of unable to accurately and rapidly binarize two dimensional code images in case of serious interference.

In order to solve the above problems, this invention is implemented in the following technical solutions.

A method for binarizing a two dimensional code image, characterized in comprising the following steps:

dividing the two dimensional code image into a plurality of block regions;

obtaining grayscale values of all pixels in each block region, and obtaining a grayscale value for each block region according to the grayscale values of all the pixels;

determining for each block region a grayscale threshold of the block region according to an average grayscale value of a predetermined area where the block region locates;

binarizing pixels in the block region according to a grayscale threshold corresponding to each block region.

Further, the process of determining for each block region a grayscale threshold of the block region according to an average grayscale value of a predetermined area where the block region locates comprises:

obtaining an average value of the grayscale values of multiple block regions included in the predetermined area as the grayscale threshold according to grayscale values of the multiple block regions.

Further, the method comprises the following step:

constructing a contrast factor according to the relationship between grayscale values of pixels in the two dimensional code image, wherein the contrast factor is proportional to the difference between a maximum grayscale value and a minimum grayscale value in the two dimensional code image;

the process of obtaining grayscale values of all pixels in each block region, and obtaining a grayscale value for each block region according to the grayscale values of all the pixels comprises:

determining a grayscale value of a block region, according to the relationship between the difference between a maximum grayscale value and a minimum grayscale value in the block region and the contrast factor, in conjunction with grayscale values of other block regions adjacent to the block region.

Further, in the process of determining a grayscale value of a block region according to the relationship between the difference between a maximum grayscale value and a minimum grayscale value in the block region and the contrast factor, in conjunction with grayscale values of other block regions adjacent to the block region, a grayscale value $\overline{y_{i,j}}$ of a block region (i,j) is obtained according to the following equation:

$$y_{ij} = \begin{cases} \dfrac{S_{ij}}{m^2} & \max_{ij} - \min_{ij} > C \\ bg & \max_{ij} - \min_{ij} <= C \,\&\&\, \min_{ij} < \\ & \left(bg = \dfrac{\overline{y_{i-1j-1}} + \overline{y_{ij-1}} * 2 + \overline{y_{i-1j}}}{4}\right) \\ \dfrac{\min_{ij}}{2} & \max_{ij} - \min_{ij} <= C \,\&\&\, \min_{ij} >= \\ & \left(bg = \dfrac{\overline{y_{i-1j-1}} + \overline{y_{ij-1}} * 2 + \overline{y_{i-1j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

Further, the contrast factor C is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_i \end{cases}$$

wherein, $C_0$, $C_1$ and $C_2$ are all constants ranging from 0 to 255, $Y_0$ and $Y_1$ are constants of brightness difference which are both constants ranging from 0 to 255.

Further, the constants of brightness difference are $Y_0=110$, $Y_1=130$.

Further, in the equation of the contrast factor C, $C_0=4$, $C_1=14$ and $C_2=24$.

Further, it is set to m=8 in the equation of the contrast factor C.

Further, in the process of determining for each block region a grayscale threshold of the block region according to an average grayscale value of a predetermined area where the block region locates:

the predetermined area comprises n×n block regions, wherein n is an integer larger than 1.

Further, the predetermined area comprises 5×5 block regions.

A system for binarizing a two dimensional code image, characterized in comprising:

an image dividing module, for dividing the two dimensional code image into a plurality of block regions;

a grayscale value obtaining module, for obtaining grayscale values of all pixels in each block region, and obtaining a grayscale value for each block region according to the grayscale values of all the pixels;

a grayscale threshold obtaining module, for determining for each block region a grayscale threshold of the block region according to an average grayscale value of a predetermined area where the block region locates;

a binarization module, for binarizing pixels in the block region according to a grayscale threshold corresponding to each block region.

Further, the grayscale threshold obtaining module is configured to obtaining an average value of the grayscale values of multiple block regions included in the predetermined area as the grayscale threshold according to grayscale values of the multiple block regions.

Further, the system further comprises:

a contrast factor construction module, for constructing a contrast factor according to the relationship between grayscale values of pixels in the two dimensional code image, wherein the contrast factor is proportional to the difference between a maximum grayscale value and a minimum grayscale value in the two dimensional code image;

wherein the grayscale value obtaining module comprises:

a block region grayscale value obtaining unit, for determining a grayscale value of a block region, according to the relationship between the difference between a maximum grayscale value and a minimum grayscale value in the block region and the contrast factor, in conjunction with grayscale values of other block regions adjacent to the block region.

Further, the block region grayscale value obtaining unit obtains a grayscale value $\overline{y_{i,j}}$ of a block region (i,j) according to the following equation:

$$\overline{y_{ij}} = \begin{cases} \dfrac{S_{ij}}{m^2} & \max_{ij} - \min_{ij} > C \\ bg & \max_{ij} - \min_{ij} <= C \,\&\&\, \min_{ij} < \\ & \left(bg = \dfrac{\overline{y_{i-1j-1}} + \overline{y_{ij-1}} * 2 + \overline{y_{i-1j}}}{4}\right) \\ \dfrac{\min_{ij}}{2} & \max_{ij} - \min_{ij} <= C \,\&\&\, \min_{ij} >= \\ & \left(bg = \dfrac{\overline{y_{i-1j-1}} + \overline{y_{ij-1}} * 2 + \overline{y_{i-1j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

Further, the contrast factor construction module constructs the contrast factor C according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_i \end{cases}$$

wherein, $C_0$, $C_1$ and $C_2$ are all constants ranging from 0 to 255, $Y_0$ and $Y_1$ are constants of brightness difference which are both constants ranging from 0 to 255.

Further, the contrast factor construction module sets the constants of brightness difference as $Y_0=110$, $Y_1=130$.

Further, the contrast factor construction module sets, in the equation of the contrast factor C, $C_0=4$, $C_1=14$ and $C_2=24$.

Further, the contrast factor construction module sets m=8.

Further, in the grayscale threshold obtaining module, the predetermined area comprises n×n block regions, wherein n is an integer larger than 1.

Further, in the grayscale threshold obtaining module, the predetermined area comprises 5×5 block regions.

The above technical solutions of this invention have the following advantages compared to those in the prior art:

(1) With the method and system for binarizing a two dimensional code images of this invention, each block region has a different grayscale threshold. Thus, for each block region, whether a pixel in the block region is determined as black or white during the restoring process is not solely based on the grayscale value of the pixel itself, but also an average grayscale value of a predetermined area specified for a block region where the pixel locates. That is to say, when the predetermined area in which the block region locates has generally a larger grayscale value, the grayscale threshold corresponding to the block region may become larger, and vice versa. That is, because the grayscale threshold of a block region is closely related to grayscale values in a background of this block region, external circumstance interference may be excluded from an obtained binary result, producing a clear binary image accordingly.

(2) In the method and system for binarizing a two dimensional code image of this invention, a contrast factor is introduced, the value of which is adjusted according to different two dimensional code images. The contrast factor is constructed based on a maximum grayscale value and a minimum grayscale value in each two dimensional code image to accommodate dimensional code images with different contrasts. Thus, the two dimentional images may be restored clearly and accurately for two dimensional code images with over high/low contrasts, and difficulty in terms of contrast in the binarization of two dimensional code images may be eliminated.

(3) The binarization method and system for the two dimensional code images of this invention adopts a simple algorithm without complex computation, at the same time, since grayscale values are averaged for multiple adjacent block regions during threshold determination, a more accurate threshold may be obtained, which may effectively avoid blocking effects and restore various two dimensional code images under interference appropriately.

(4) With the method and system for binarizing a two dimensional code image of this invention, special measures are taken for block regions located at edges or corners, so that favourable binary images may be obtained without blurred edges, laying a solid foundation for a later decoding step.

BRIEF DESCRIPTION OF THE DRAWINGS

For a clear understanding of the content of this invention, this invention will be further described according to particular embodiments in reference to drawings.

DESCRIPTION OF THE EMBODIMENTS

Embodiment 1

Figure 1:
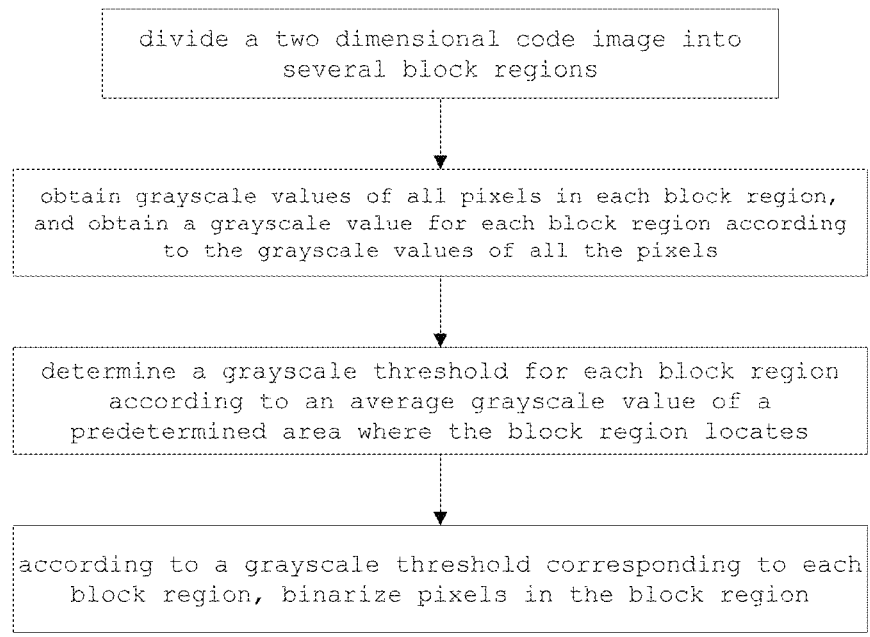
FIG. 1 is a flowchart of a method for binarizing a two dimensional code image according to an embodiment of this invention.

A method for binarizing a two dimensional code image of this embodiment, as shown in FIG. 1, comprises the following steps:

dividing the two dimensional code image into a plurality of block regions;

obtaining grayscale values of all pixels in each block region, and obtaining a grayscale value for each block region according to the grayscale values of all the pixels;

determining for each block region a grayscale threshold of the block region according to an average grayscale value of a predetermined area where the block region locates;

binarizing pixels in the block region according to a grayscale threshold corresponding to each block region.

The core concept of the above technical solution lies in that each block region has a different grayscale threshold, and thus for each block region, whether a pixel in the block region is determined to be black or white is not solely based on the grayscale value of the pixel itself, but also an average grayscale value of a predetermined area in which a block region containing the pixel locates. For example, when a pixel has a grayscale value of 150, if the average grayscale value of a predetermined area where the block region locates is 180, i.e., the grayscale threshold is 180, during the binarization process of the block region, because the grayscale value of the pixel is less than the grayscale threshold, it should be set to black. For the same pixel having a grayscale value of 150, if the average grayscale value of a predetermined area where the block region locates is 100, i.e., the grayscale threshold is 100, the grayscale value of the pixel is larger than the grayscale threshold and the pixel should be determined as white in the binarization process. Each pixel in the block region is determined according to such a decision criterion to get its binary value. Then, such decision is made for different pixels in each block region to binarize the entire two dimensional code image according to determined binary values, and thus realize the binarization process of the two dimensional code image. It may be readily appreciated that the entire two dimensional code image may be selected as the predetermined area at most, and one or several block regions adjacent to the block region may be selected as the predetermined area at least. The more block regions, i.e., the more block regions the predetermined area includes, the more accurate result may be obtained, with an impact on processing speed, however. In the above solution of this embodiment, relative grayscale values of each block region in a predetermined area are considered, wherein the size of the block region and the size of the predetermined area may be set according to the computational capability of the system and the user's acceptance of computing time.

In this embodiment, the process of determining for each block region a grayscale threshold of the block region according to an average grayscale value of a predetermined area where the block region locates comprises:

obtaining an average value of the grayscale values of multiple block regions included in the predetermined area as the grayscale threshold according to grayscale values of the multiple block regions.

In this embodiment, in the process of determining for each block region a grayscale threshold of the block region according to an average grayscale value of a predetermined area where the block region locates:

the predetermined area comprises n×n block regions, wherein n is an integer larger than 1. As described above, the predetermined area may be selected according to the computational capability of the system and the user's acceptance of computing time. In general, it is preferred to achieve both faster response and better performance. Certainly, the predetermined area may be further increased in pursuit of the accuracy of the binarization process. However, with an overall consideration of the amount of computation and actual demand, the predetermined area preferably comprises 5×5 block regions.

Figure 2:
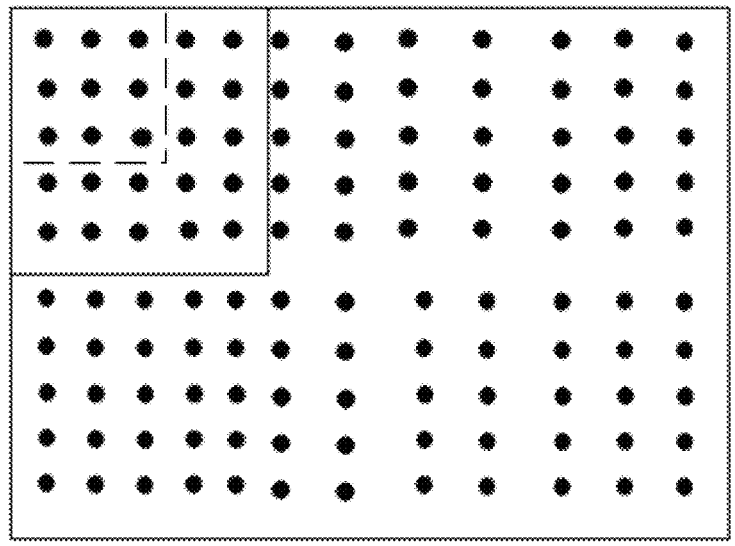
FIG. 2 is a schematic diagram of selecting a predetermined area in an embodiment.

As shown in FIG. 2, each spot represents a block region. In the case of a predetermined area including 5×5 block regions, for a block region (3,3) at row 3 column 3 in the figure as an example, the predetermined area where it locates is a square area shown in the figure, which includes total 25 block regions. Thus, its grayscale threshold is the average grayscale value of the 25 block regions.

Figure 3:
FIG. 3 is a two dimensional code image.
Figure 4:
FIG. 4 shows an image resulted after binarizing a two dimensional code according to an embodiment of this invention.

Note that in the case of a block region on an edge or a corner, not all 5×5 block regions centred at the block region can be found in the two dimensional code image, in which case, remaining block regions of the 5×5 block regions centred at the block region may be selected alternatively. For a block region on row 1 column 1 as an example, not all 25 block regions may be found for the block region, and thus block regions shown by a dashed line in the figure are selected as the predetermined area. Thus, grayscale values of the dashed block regions are summed and then averaged to get a grayscale threshold of the block region. With such a process for block regions on edges or corners, a favourable binary image may be obtained without blurred edges. Such an effect may be observed in conjunction with an original image of the two dimensional code image shown in FIG. 3 and an image (shown in FIG. 4) obtained after binarizing the two dimensional code according to the method of this embodiment. It may be seen apparently that the binary image of the two dimensional code shown in FIG. 4 may restore the two dimensional code image clearly and accurately, and may separate target objects of the two dimensional code image from its background appropriately, so that impacts caused by darkness or non-uniform illumination may be overcome.

The method for binarizing a two dimensional code images of this embodiment may restore a two dimensional code image clearly and accurately, and may separate target objects of the two dimensional code image from its background appropriately, so that impacts caused by darkness or non-uniform illumination may be overcome. The algorithm is simple without complex computation. At the same time, since grayscale values are averaged for multiple adjacent block regions during the threshold determination, a more accurate threshold may be obtained, which may effectively avoid blocking effects and restore various two dimensional code images under interference appropriately.

Preferably, the binarization method of this embodiment further comprises the following steps:

constructing a contrast factor according to the relationship between grayscale values of pixels in the two dimensional code image, wherein the contrast factor is proportional to the difference between a maximum grayscale value and a minimum grayscale value in the two dimensional code image;

the process of obtaining grayscale values of all pixels in each block region, and obtaining a grayscale value for each block region according to the grayscale values of all the pixels comprises:

determining a grayscale value of a block region, according to the relationship between the difference between a maximum grayscale value and a minimum grayscale value in the block region and the contrast factor, in conjunction with grayscale values of other block regions adjacent to the block region.

In this embodiment, a grayscale value $\overline{y_{i,j}}$ of a block region (i,j) is obtained according to the following equation:

$$\overline{y_{ij}} = \begin{cases} \frac{S_{ij}}{m^2} & \max_{ij} - \min_{ij} > C \\ bg & \max_{ij} - \min_{ij} <= C \,\&\&\, \min_{ij} < \\ & \left(bg = \frac{\overline{y_{i-1\,j-1}} + \overline{y_{ij-1}} * 2 + \overline{y_{i-1\,j}}}{4}\right) \\ \frac{\min_{ij}}{2} & \max_{ij} - \min_{ij} <= C \,\&\&\, \min_{ij} >= \\ & \left(bg = \frac{\overline{y_{i-1\,j-1}} + \overline{y_{ij-1}} * 2 + \overline{y_{i-1\,j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

A contrast factor is concerned in the acquisition of the grayscale value $\overline{y_{i,j}}$. As described above, the contrast factor is related to the difference between a maximum grayscale value and a minimum grayscale value of the entire two dimensional code image. For each block region, when the difference between a maximum grayscale value and a minimum grayscale value of the block region is larger than the contrast factor, it may be conceived that pixels in the block region has poor uniformity in grayscale values and it is hard to select a value to represent the average grayscale value of this block region, so an average grayscale value is calculated by directly dividing the sum of grayscale values of all pixels by the number of those pixels. When the difference of a maximum grayscale value and a minimum grayscale value of a block region is smaller than the contrast factor, it may be conceived that grayscale values of all pixels in the block region has better uniformity, and a value may be selected to represent the average grayscale value of the entire block region, which may further be described in two cases.

For the convenience of description, a partial neighbourhood is defined for a block region as several block regions adjacent to the block region. When the minimal grayscale value of the block region is less than the average grayscale value of its partial neighbourhood, i.e., the grayscale values of the block region are lower than the grayscale values of its background, in theory, the block region has lower grayscale values and is expected to be set to black finally. However, because the final binarization result will be decided in conjunction with a threshold, pixels in the block region are finally set to black only if their values are less than a corresponding grayscale threshold. Because the setting of the grayscale threshold takes average grayscale values of all block regions contained in a predetermined area into account, the average grayscale value of the block region may be set as the average grayscale value of the partial neighbourhood to reasonably expand the threshold to the greatest extent. Setting the average grayscale value of the block region to a large value may expand the grayscale threshold reasonably and may increase the probability of getting a pixel in the block region determined as black during the binarization process.

On the contrary, when the minimal grayscale value is larger than the average grayscale value of the partial neighbourhood, i.e., the block region has higher grayscale values, and it is expected to be set to white. To reasonably lower the threshold to the greatest extent, the average grayscale value of the block region may be set to be the half of the minimal grayscale value and thus is a smaller value, which may lower the grayscale threshold reasonably and increase the probability of getting pixels in the block region determined as white during the binarization process.

Note that the concept of the partial neighbourhood described above may be selected flexibly. If the partial neighbourhood is defined as comprising block region (i−1,j−1), block region (i,j−1), and block region (i−1,j), the value of bg may be $$\frac{\overline{y_{i-1j-1}} + \overline{y_{ij-1}} * 2 + \overline{y_{i-1j}}}{4}$$

or $$\frac{\overline{y_{i-1j-1}} + \overline{y_{ij-1}} + \overline{y_{i-1j}}}{3}.$$

If the partial neighbourhood is defined as comprising four block regions, such as block region (i−1,j−1), block region (i,j−1), block region (i−1,j), and block region (i−1,j+1), the value of bg may be $$\frac{\overline{y_{i-1j-1}} + \overline{y_{ij-1}} + \overline{y_{i-1j+1}} + \overline{y_{i-1j}}}{4},$$

or may be computed in other ways, which will not be described in detail herein.

Because the average grayscale value of each block region is computed according to a certain sequence, in the selection of the partial neighbourhood, those block regions having their average grayscale values computed are generally selected. The above selection of the partial neighbourhood is merely illustrative and is not a limit. Those skilled in related arts may appreciate that other obvious methods of selecting the partial neighbourhood are still in the protection scope of this embodiment. Computing average grayscale values for block regions may provide adequate assurance about the reasonability of partial neighbourhood selection, as well as a flexible value of bg.

In this embodiment, preferably, the contrast factor is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_i \end{cases}$$

Wherein, $C_0$, $C_1$ and $C_2$ are all constants ranging from 0 to 255, $Y_0$ and $Y_1$ are constants of brightness difference which are both constants ranging from 0 to 255.

Both $Y_0$ and $Y_1$ range from 0 to 255. Because a grayscale image has grayscale values ranging from 0 to 255, an ideal binarization effect may be obtained with $Y_0=110$ and $Y_1=130$ after large amount of test. Thus, preferably, the constants of brightness difference are $Y_0=110$ and $Y_1=130$.

$C_0$, $C_1$ and $C_2$ range from 0 to 255 and are ascending in sequence. An ideal binarization effect may be obtained with $C_0=4$, $C_1=14$ and $C_2=24$ after large amount of test. Thereby, in the equation of the contrast factor C, preferably, $C_0=4$, $C_1=14$ and $C_2=24$.

In the method for binarizing two dimensional code images of this embodiment, a contrast factor is introduced, the value of which is adjusted correspondingly according to different two dimensional code images. The contrast factor is constructed based on a maximum grayscale value and a minimum grayscale value in each two dimensional code image to accommodate two dimensional code images with different contrasts. Thus, binary images may be restored clearly and accurately for two dimensional code images with over high/low contrasts, and difficulty in terms of contrast in the binarization of two dimensional code images may be eliminated.

In this embodiment, in the dividing step, the two dimensional code image is divided into block regions having the same size, each comprising m×m pixels, wherein m is an integer larger than 1. The number of block regions is:

Number of horizontal blocks: subW=W/m, wherein W represents the total number of pixels in the horizontal direction.

Number of vertical blocks: subH=H/m, wherein H represents the total number of pixels in the vertical direction.

There are various specifications for two dimensional code images, for example, 640×640 pixels, 752×480 pixels, 1280×720 pixels, etc. When photographing two dimensional images of different specifications, the ratio of the part of two dimensional code versus the entire image is constant, the size of a block image may be determined according to the product of the length and width of a grayscale image. For example, a two dimensional code grayscale image having 640×640 pixels may be divided into block regions each having 4×4 pixels; a two dimensional code grayscale image having 752×480 pixels may be divided into block regions each having 40×40 pixels; a two dimensional code grayscale image having 1280×720 pixels may be divided into block regions each having 80×80 pixels. However, in order to ensure binarization precision and reduce unnecessary computation as much as possible, in the dividing step, each block region preferably includes 8×8 pixels. Certainly, other dividing methods are all within the protection scope of this invention, which will not be described in detail herein.

Embodiment 2

Figure 5:
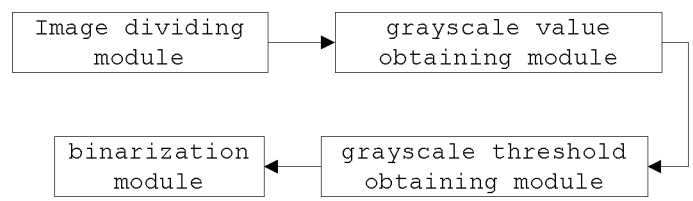
FIG. 5 is a schematic diagram of a structure of a system for binarizing a two dimensional code image according to an embodiment of this invention.

A system for binarizing a two dimensional code image of this embodiment, as shown in FIG. 5, comprises:

an image dividing module, for dividing the two dimensional code image into a plurality of block regions;

a grayscale value obtaining module, for obtaining grayscale values of all pixels in each block region, and obtaining a grayscale value for each block region according to the grayscale values of all the pixels;

a grayscale threshold obtaining module, for determining for each block region a grayscale threshold of the block region according to an average grayscale value of a predetermined area where the block region locates;

a binarization module, for binarizing pixels in the block region according to a grayscale threshold corresponding to each block region.

The core concept of the above technical solution lies in that each block region has a different grayscale threshold, and thus for each block region, whether a pixel in the block region is determined to be black or white is not solely based on the grayscale value of the pixel itself, but also an average grayscale value of regions adjacent to the block region containing the pixel. For example, when a pixel has a grayscale value of 150, if the average grayscale value of a predetermined area where the block region locates is 180, i.e., the grayscale threshold is 180, during the binarization process of the block region, because the grayscale value of the pixel is less than the grayscale threshold, it should be set to black. For the same pixel having a grayscale value of 150, if the average grayscale value of a predetermined area where the block region locates is 100, i.e., the grayscale threshold is 100, the grayscale value of the pixel is larger than the grayscale threshold and the pixel should be determined as white in the binarization process. Each pixel in the block region is determined according to such a decision criterion to get its binary value. Then, such decision is made for different pixels in each block region to binarize the entire two dimensional code image according to determined binary values, and thus realize the binarization process of the two dimensional code image. It may be readily appreciated that the entire two dimensional code image may be selected as the predetermined area at most, and one or several block regions adjacent to the block region may be selected as the predetermined area at least. The more block regions, i.e., the more block regions the predetermined area includes, the more accurate result may be obtained, with an impact on processing speed, however. In the above solution of this embodiment, relative grayscale values of each block region in a predetermined area are considered, wherein the size of the block region and the size of the predetermined area may be set according to the computational capability of the system and the user's acceptance of computing time.

Preferably, the grayscale threshold obtaining module is configured to obtain an average value of the grayscale values of multiple block regions included in the predetermined area as the grayscale threshold according to grayscale values of the multiple block regions.

In this embodiment, in grayscale threshold obtaining module, the predetermined area comprises n×n block regions, wherein n is an integer larger than 1. As described above, the predetermined area may be selected according to the computational capability of the system and the user's acceptance of computing time. In general, it is preferred to achieve both faster response and better performance. Certainly, the predetermined area may be further increased in pursuit of the accuracy of the binarization process. However, with an overall consideration of the amount of computation and actual demand, the predetermined area preferably comprises 5×5 block regions.

Note that in the case of a block region on an edge or a corner, not all 5×5 block regions centred at the block region can be found in the two dimensional code image, in which case, remaining block regions of the 5×5 block regions centred at the block region may be selected alternatively. For a block region on row 1 column 1 as an example, not all 25 block regions may be found for the block region, and thus block regions shown by a dashed line in the figure are selected as the predetermined area. Thus, grayscale values of the dashed block regions are summed and then averaged to get a grayscale threshold of the block region. With such a process for block regions on edges or corners, a favourable binary image may be obtained without blurred edges. Such an effect may be observed in conjunction with an original image of the two dimensional code image shown in FIG. 3 and an image (shown in FIG. 4) obtained after binarizing the two dimensional code according to the method of this embodiment. It may be seen apparently that the binary image of the two dimensional code shown in FIG. 4 may restore the two dimensional code image clearly and accurately, and may separate target objects of the two dimensional code image from its background appropriately, so that impacts caused by darkness or non-uniform illumination may be overcome.

The binarization system for two dimensional code images of this embodiment may restore a two dimensional code image clearly and accurately, and may separate target objects of the two dimensional code image from its background appropriately, so that impacts caused by darkness or non-uniform illumination may be overcome. The algorithm is simple without complex computation. At the same time, since grayscale values are averaged for multiple adjacent block regions during the threshold determination, a more accurate threshold may be obtained, which may effectively avoid blocking effects and restore various two dimensional code images under interference appropriately.

Preferably, the binarization system of this embodiment further comprises:

a contrast factor construction module, for constructing a contrast factor according to the relationship between grayscale values of pixels in the two dimensional code image, wherein the contrast factor is proportional to the difference between a maximum grayscale value and a minimum grayscale value in the two dimensional code image;

wherein the grayscale value obtaining module comprises:

a block region grayscale value obtaining unit, for determining a grayscale value of a block region, according to the relationship between the difference between a maximum grayscale value and a minimum grayscale value in the block region and the contrast factor, in conjunction with grayscale values of other block regions adjacent to the block region.

In this embodiment, a grayscale value $\overline{y_{i,j}}$ of a block region (i,j) is obtained according to the following equation:

$$\overline{y_{ij}} = \begin{cases} \dfrac{S_{ij}}{m^2} & \max_{ij} - \min_{ij} > C \\ bg & \max_{ij} - \min_{ij} <= C \ \&\&\ \min_{ij} < \\ & \left(bg = \dfrac{\overline{y_{i-1j-1}} + \overline{y_{ij-1}} * 2 + \overline{y_{i-1j}}}{4}\right) \\ \dfrac{\min_{ij}}{2} & \max_{ij} - \min_{ij} <= C \ \&\&\ \min_{ij} >= \\ & \left(bg = \dfrac{\overline{y_{i-1j-1}} + \overline{y_{ij-1}} * 2 + \overline{y_{i-1j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

A contrast factor is concerned in the acquisition of the grayscale value $\overline{y_{i,j}}$. As described above, the contrast factor is related to the difference between a maximum grayscale value and a minimum grayscale value of the entire two dimensional code image. For each block region, when the difference between a maximum grayscale value and a minimum grayscale value of the block region is larger than the contrast factor, it may be conceived that pixels in the block region has poor uniformity in grayscale values and it is hard to select a value to represent the average grayscale value of this block region, so an average grayscale value is calculated by directly dividing the sum of grayscale values of all pixels by the number of those pixels. When the difference of a maximum grayscale value and a minimum grayscale value of a block region is smaller than the contrast factor, it may be conceived that grayscale values of all pixels in the block region has better uniformity, and a value may be selected to represent the average grayscale value of the entire block region, which may further be described in two cases.

For the convenience of description, a partial neighbourhood is defined for a block region as several block regions adjacent to the block region. When the minimal grayscale value of the block region is less than the average grayscale value of its partial neighbourhood, i.e., the grayscale values of the block region are lower than the grayscale values of its background, in theory, the block region has lower grayscale values and is expected to be set to black finally. However, because the final binarization result will be decided in conjunction with a threshold, pixels in the block region are finally set to black only if their values are less than a corresponding grayscale threshold. Because the setting of the grayscale threshold takes average grayscale values of all block regions contained in a predetermined area into account, the average grayscale value of the block region may be set as the average grayscale value of the partial neighbourhood to reasonably expand the threshold to the greatest extent. Setting the average grayscale value of the block region to a large value may expand the grayscale threshold reasonably and may increase the probability of getting a pixel in the block region determined as black during the binarization process.

On the contrary, when the minimal grayscale value is larger than the average grayscale value of the partial neighbourhood, i.e., the block region has higher grayscale values, and it is expected to be set to white. To reasonably lower the threshold to the greatest extent, the average grayscale value of the block region may be set to be the half of the minimal grayscale value and thus is a smaller value, which may lower the grayscale threshold reasonably and increase the probability of getting pixels in the block region determined as white during the binarization process.

Note that the concept of the partial neighbourhood described above may be selected flexibly. If the partial neighbourhood is defined as comprising block region (i−1,j−1), block region (i,j−1), and block region (i−1,j), the value of bg may be $$\frac{\overline{y_{i-1j-1}} + \overline{y_{ij-1}} * 2 + \overline{y_{i-1j}}}{4}$$

or $$\frac{\overline{y_{i-1j-1}} + \overline{y_{ij-1}} + \overline{y_{i-1j}}}{3}.$$

If the partial neighbourhood is defined as comprising four block regions, such as block region (i−1,j−1), block region (i,j−1), block region (i−1,j), and block region (i−1,j+1), the value of bg may be $$\frac{\overline{y_{i-1j-1}} + \overline{y_{ij-1}} + \overline{y_{i-1j+1}} + \overline{y_{i-1j}}}{4},$$

or may be computed in other ways, which will not be described in detail herein.

Because the average grayscale value of each block region is computed according to a certain sequence, in the selection of the partial neighbourhood, those block regions having their average grayscale values computed are generally selected. The above selection of the partial neighbourhood is merely illustrative and is not a limit. Those skilled in related arts may appreciate that other obvious methods of selecting the partial neighbourhood are still in the protection scope of this embodiment. Computing average grayscale values for block regions may provide adequate assurance about the reasonability of partial neighbourhood selection, as well as a flexible value of bg.

In this embodiment, preferably, the contrast factor construction module constructs the contrast factor C according to the following equation in:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

Wherein, $C_0$, $C_1$ and $C_2$ are all constants ranging from 0 to 255, $Y_0$ and $Y_1$ are constants of brightness difference which are both constants ranging from 0 to 255.

Both $Y_0$ and $Y_1$ range from 0 to 255. Because a grayscale image has grayscale values ranging from 0 to 255, an ideal binarization effect may be obtained with $Y_0=110$ and $Y_1=130$ after large amount of test. Thus, preferably, the constants of brightness difference are $Y_0=110$ and $Y_1=130$.

$C_0$, $C_1$ and $C_2$ range from 0 to 255 and are ascending in sequence. An ideal binarization effect may be obtained with $C_0=4$, $C_1=14$ and $C_2=24$ after large amount of test. Thereby, in the equation of the contrast factor C, preferably, $C_0=4$, $C_1=14$ and $C_2=24$.

In the system for binarizing two dimensional code images of this embodiment, a contrast factor is introduced, the value of which is adjusted correspondingly according to different two dimensional code images. The contrast factor is constructed based on a maximum grayscale value and a minimum grayscale value in each two dimensional code image to accommodate two dimensional code images with different contrasts. Thus, binary images may be restored clearly and accurately for two dimensional code images with over high/low contrasts, and difficulty in terms of contrast in the binarization of two dimensional code images may be eliminated.

In this embodiment, in the dividing step, the two dimensional code image is divided into block regions having the same size, each comprising m×m pixels, wherein m is an integer larger than 1. The number of block regions is:

Number of horizontal blocks: subW=W/m, wherein W represents the total number of pixels in the horizontal direction.

Number of vertical blocks: subH=H/m, wherein H represents the total number of pixels in the vertical direction.

There are various specifications for two dimensional code images, for example, 640×640 pixels, 752×480 pixels, 1280×720 pixels, etc. When photographing two dimensional images of different specifications, the ratio of the part of two dimensional code versus the entire image is constant, the size of a block image may be determined according to the product of the length and width of a grayscale image. For example, a two dimensional code grayscale image having 640×640 pixels may be divided into block regions each having 4×4 pixels; a two dimensional code grayscale image having 752×480 pixels may be divided into block regions each having 40×40 pixels; a two dimensional code grayscale image having 1280×720 pixels may be divided into block regions each having 80×80 pixels. However, in order to ensure binarization precision and reduce unnecessary computation as much as possible, in the dividing step, each block region preferably includes 8×8 pixels. Certainly, other dividing methods are all within the protection scope of this invention, which will not be described in detail herein.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

Figure 6:
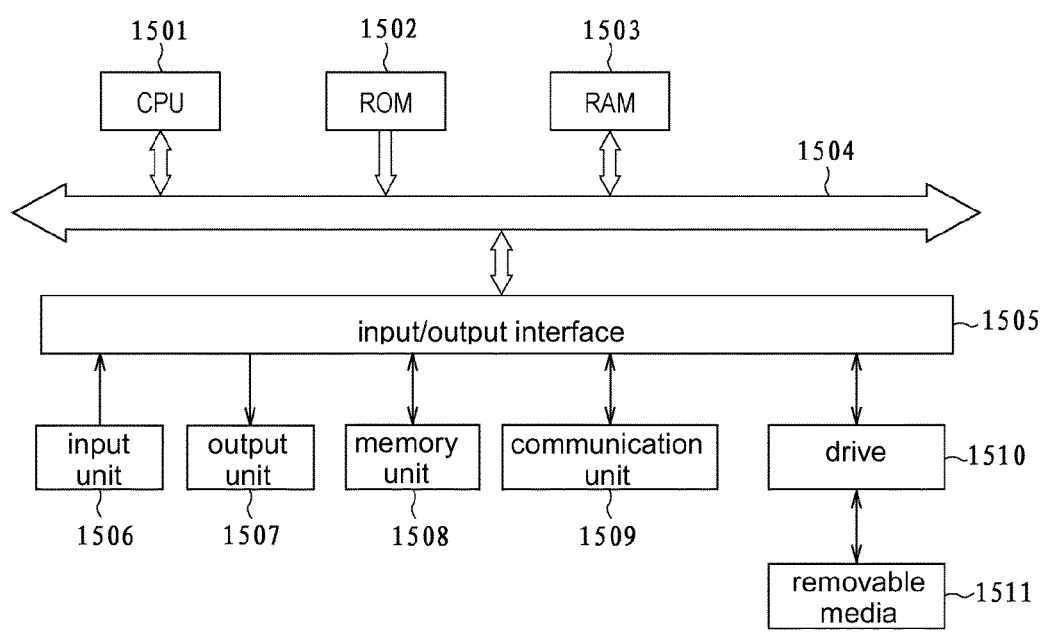
FIG. 6 shows a block diagram of an example of the structure of a computer.

FIG. 6 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for binarizing a two dimensional code image, the method comprising:
dividing the two dimensional code image into a plurality of block regions;
obtaining grayscale values of all pixels in each block region, and obtaining a grayscale value for each block region according to the grayscale values of all the pixels;
determining for each block region a grayscale threshold of the block region according to an average grayscale value of a predetermined area where the block region locates;
binarizing pixels in the block region according to a grayscale threshold corresponding to each block region;
wherein the process of determining for each block region a grayscale threshold of the block region according to an average grayscale value of a predetermined area where the block region locates comprises:
obtaining an average value of the grayscale values of multiple block regions included in the predetermined area as the grayscale threshold according to grayscale values of the multiple block regions.

2. The method of claim 1 further comprising:
constructing a contrast factor according to the relationship between grayscale values of pixels in the two dimensional code image, wherein the contrast factor is proportional to the difference between a maximum grayscale value and a minimum grayscale value in the two dimensional code image;
the process of obtaining grayscale values of all pixels in each block region, and obtaining a grayscale value for each block region according to the grayscale values of all the pixels comprises:
determining a grayscale value of a block region, according to the relationship between the difference between a maximum grayscale value and a minimum grayscale value in the block region and the contrast factor, in conjunction with grayscale values of other block regions adjacent to the block region.

3. The method of claim 2 wherein in the process of determining a grayscale value of a block region according to the relationship between the difference between a maximum grayscale value and a minimum grayscale value in the block region and the contrast factor, in conjunction with grayscale values of other block regions adjacent to the block region, a grayscale value of a block region (i,j) is obtained according to the following equation:

$$\overline{y_{ij}} = \begin{cases} \frac{S_{ij}}{m^2} & \max_{ij} - \min_{ij} > C \\ bg & \max_{ij} - \min_{ij} <= C \;\&\&\; \min_{ij} < \\ & \left(bg = \frac{\overline{y_{i-1j-1}} + \overline{y_{ij-1}}*2 + \overline{y_{i-1j}}}{4}\right) \\ \frac{\min_{ij}}{2} & \max_{ij} - \min_{ij} <= C \;\&\&\; \min_{ij} >= \\ & \left(bg = \frac{\overline{y_{i-1j-1}} + \overline{y_{ij-1}}*2 + \overline{y_{i-1j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

4. The method of claim 2 wherein the contrast factor C is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_i \end{cases}$$

wherein, $C_0$, $C_1$ and $C_2$ are all constants ranging from 0 to 255, $Y_0$ and $Y_1$ are constants of brightness difference which are both constants ranging from 0 to 255.

5. The method of claim 4 wherein the constants of brightness difference are $Y_0=110$, $Y_1=130$.

6. The method of claim 4 wherein in the equation of the contrast factor C, $C_0=4$, $C_1=14$ and $C_2=24$.

7. The method of claim 4 wherein it is set to m=8 in the equation of the contrast factor C.

8. The method of claim 1 wherein determining for each block region a grayscale threshold of the block region according to an average grayscale value of a predetermined area where the block region locates:
the predetermined area comprises n×n block regions, wherein n is an integer larger than 1.

9. The method of claim 8 wherein the predetermined area comprises 5×5 block regions.

10. A system for binarizing a two dimensional code image, the system comprising:
an image dividing module, for dividing the two dimensional code image into a plurality of block regions;
a grayscale value obtaining module, for obtaining grayscale values of all pixels in each block region, and obtaining a grayscale value for each block region according to the grayscale values of all the pixels;
a grayscale threshold obtaining module, for determining for each block region a grayscale threshold of the block region according to an average grayscale value of a predetermined area where the block region locates;
a binarization module, for binarizing pixels in the block region according to a grayscale threshold corresponding to each block region;
wherein the grayscale threshold obtaining module is configured for obtaining an average value of the grayscale values of multiple block regions included in the predetermined area as the grayscale threshold according to grayscale values of the multiple block regions.

11. The system of claim 10 further comprising:
a contrast factor construction module, for constructing a contrast factor according to the relationship between grayscale values of pixels in the two dimensional code image, wherein the contrast factor is proportional to the difference between a maximum grayscale value and a minimum grayscale value in the two dimensional code image;
wherein the grayscale value obtaining module comprises:
a block region grayscale value obtaining unit, for determining a grayscale value of a block region, according to the relationship between the difference between a maximum grayscale value and a minimum grayscale value in the block region and the contrast factor, in conjunction with grayscale values of other block regions adjacent to the block region.

12. The system of claim 11 the block region grayscale value obtaining unit obtains a grayscale value $\overline{y_{i,j}}$ of a block region (i,j) according to the following equation:

$$\overline{y_{ij}} = \begin{cases} \dfrac{S_{ij}}{m^2} & \max_{ij} - \min_{ij} > C \\ bg & \max_{ij} - \min_{ij} <= C \;\&\&\; \min_{ij} < \\ & \left(bg = \dfrac{\overline{y_{i-1j-1}} + \overline{y_{ij-1}}*2 + \overline{y_{i-1j}}}{4}\right) \\ \dfrac{\min_{ij}}{2} & \max_{ij} - \min_{ij} <= C \;\&\&\; \min_{ij} >= \\ & \left(bg = \dfrac{\overline{y_{i-1j-1}} + \overline{y_{ij-1}}*2 + \overline{y_{i-1j}}}{4}\right) \end{cases}$$

wherein, i represents the number of a row in which the block region locates, j represents the number of a column in which the block region locates, $S_{ij}$ represents the sum of grayscale values of all pixels in the block region, C represents a contrast factor, $\max_{ij}$ represents a maximum grayscale value in the block region, $\min_{ij}$ represents a minimum grayscale value in the block region, m represents that the block region includes m×m pixels, m is an integer larger than 1.

13. The system of claim 11 wherein the contrast factor construction module constructs the contrast factor C according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_i \end{cases}$$

wherein, $C_0$, $C_1$ and $C_2$ are all constants ranging from 0 to 255, $Y_0$ and $Y_1$ are constants of brightness difference which are both constants ranging from 0 to 255.

14. The system of claim 13 wherein the contrast factor construction module sets the constants of brightness difference as $Y_0=110$, $Y_1=130$.

15. The system of claim 13 wherein the contrast factor construction module sets, in the equation of the contrast factor C, $C_0=4$, $C_1=14$ and $C_2=24$.

16. The system of claim 13 wherein the contrast factor construction module sets m=8.

17. The system of claim 10 wherein the grayscale threshold obtaining module, the predetermined area comprises n×n block regions, wherein n is an integer larger than 1.

18. The system of claim 17 wherein the grayscale threshold obtaining module, the predetermined area comprises 5×5 block regions.

19. A system for binarizing a two dimensional code image, the system comprising a processor, wherein the processor is configured to:
divide the two dimensional code image into a plurality of block regions;
obtain grayscale values of all pixels in each block region, and obtaining a grayscale value for each block region according to the grayscale values of all the pixels;
determine for each block region a grayscale threshold of the block region according to an average grayscale value of a predetermined area where the block region locates;
binarize pixels in the block region according to a grayscale threshold corresponding to each block region;
wherein the processor is further configured to obtain an average value of the grayscale values of multiple block regions included in the predetermined area as the grayscale threshold according to grayscale values of the multiple block regions.

* * * * *